United States Patent [19]

Focke et al.

[11] Patent Number: 4,865,516

[45] Date of Patent: Sep. 12, 1989

[54] ROTATABLE ELEVATING CARRIER FOR A PALLETIZER

[75] Inventors: Heinz Focke, Verden; Johannes Holloch, Langwedel, both of Fed. Rep. of Germany

[73] Assignee: Focke & Co., GmbH, Verden, Fed. Rep. of Germany

[21] Appl. No.: 188,568

[22] Filed: Apr. 29, 1988

[30] Foreign Application Priority Data

May 13, 1987 [DE] Fed. Rep. of Germany ....... 3715888

[51] Int. Cl.[4] ............................................ B65G 61/00

[52] U.S. Cl. .................................. 414/792.8; 901/21; 74/89.12; 74/108; 187/20

[58] Field of Search ....................... 414/70, 71; 901/21; 187/1 A, 20; 24/37; 474/218; 74/89.21, 108

[56] References Cited

U.S. PATENT DOCUMENTS

| | | | |
|---|---|---|---|
| 4,507,044 | 3/1985 | Hutchins et al. | 901/21 X |
| 4,597,707 | 7/1986 | Cornacchia | 414/70 |

FOREIGN PATENT DOCUMENTS

| | | | |
|---|---|---|---|
| 3417845 | 12/1985 | Fed. Rep. of Germany . | |
| 3638991 | 5/1988 | Fed. Rep. of Germany | 414/71 |
| 1106380 | 7/1955 | France | 74/89.21 |
| 2442781 | 8/1980 | France | 901/21 |

*Primary Examiner*—Robert J. Spar

*Assistant Examiner*—James Eller

*Attorney, Agent, or Firm*—Sughrue, Mion, Zinn, Macpeak & Seas

[57] ABSTRACT

Lifter for loads, in particular a palletizer for stackable objects, comprising a load carrier which can be moved up and down, in particular an articulated swivel arm (16) on whose free end an element is arranged for seizing the objects, the up and down or lifting and lowering movements of the load carrier being effected along a vertical guide, in particular along upright columns (19), and a drive (13)for the lifting and lowering movement of the load carrier at the upper or lower end of the vertical guide (columns 19), the connection between the drive (13) and the load carrier (swivel arm 16) being made by a toothed belt (14) which on one side is passed around a pinion (15) allocated to the drive (13) and on the other side is passed around a toothed disc (17) rotatably mounted on the end of the vertical guide (columns 19) opposite the drive side and whose free ends are each attached to the load carrier or a guide block (26) of the same. To attach the free toothed-belt ends (10, 11) to the guide block (26) the former are each passed over a part of a toothed wheel, in particular a toothed half-wheel (toothed half-wheel roller 20, 21), fixed to the guide block (26), while the complementary toothed systems of toothed belt and toothed wheel or toothed roller engage positively.

7 Claims, 3 Drawing Sheets

ROTATABLE ELEVATING CARRIER FOR A PALLETIZER

BACKGROUND OF THE INVENTION

The invention relates to a lifter, in particular a palletizer.

Lifters having an articulated swivel arm are known as so-called robots for use in many technical fields. These are also being increasingly used in the field of packaging technology as palletizers for receiving (Large) packages or cartons from a lower level in particular from a feed conveyor, and for automatic transfer to one or more pallets. The operation of a lifter of this type generally proceeds in jolts. The toothed belt connected on one side to the load carrier and on the other side to a drive is accordingly loaded joltily, the loading on the toothed belt being particularly critical in the area where it is attached to the load carrier. Here, there is the risk of the toothed belt actually coming off after prolonged service and corresponding fatigue of the toothed belt material.

SUMMARY OF THE INVENTION

The object of the present invention is therefore to create a permanently jolt-proof connection between the toothed belt and the load carrier.

According to the invention, the ends of the toothed belt are therefore each anchored on the guide block of the load carrier via a part of a toothed wheel, preferable via a toothed half-wheel. In this arrangement, the toothed-belt ends are each passed across the toothed surface of the toothed anchoring wheel while the complementary toothed systems of toothed belt and toothed wheel engage positively. Consequently, an extremely favourable force transfer becomes possible, namely distribution over a plurality of anchoring points.

With the toothed belt of an appropriate width, the toothed anchoring wheels or toothed-wheel anchoring segments are designed as toothed rollers or toothed-roller segments.

The retaining straps essentially only have the function of preventing the toothed-belt ends from falling off the associated toothed anchoring wheels or rollers. No significant tensile forces need be absorbed here.

The following make possible a plurality of adjustments at the same time:

Equal loading at the edges of the belt, which is particularly important with a relatively wide toothed belt; and the toothed-belt tension.

Moreover, the design according to the invention of the fixing of the toothed belt to the load carrier is distinguished by an extremely short or compact form of construction.

An exemplary embodiment of the invention is described below in greater detail with reference to the drawings, in which:

DETAILED DESCRIPTION OF A PREFERRED EMBODIMENT

Figure 1:
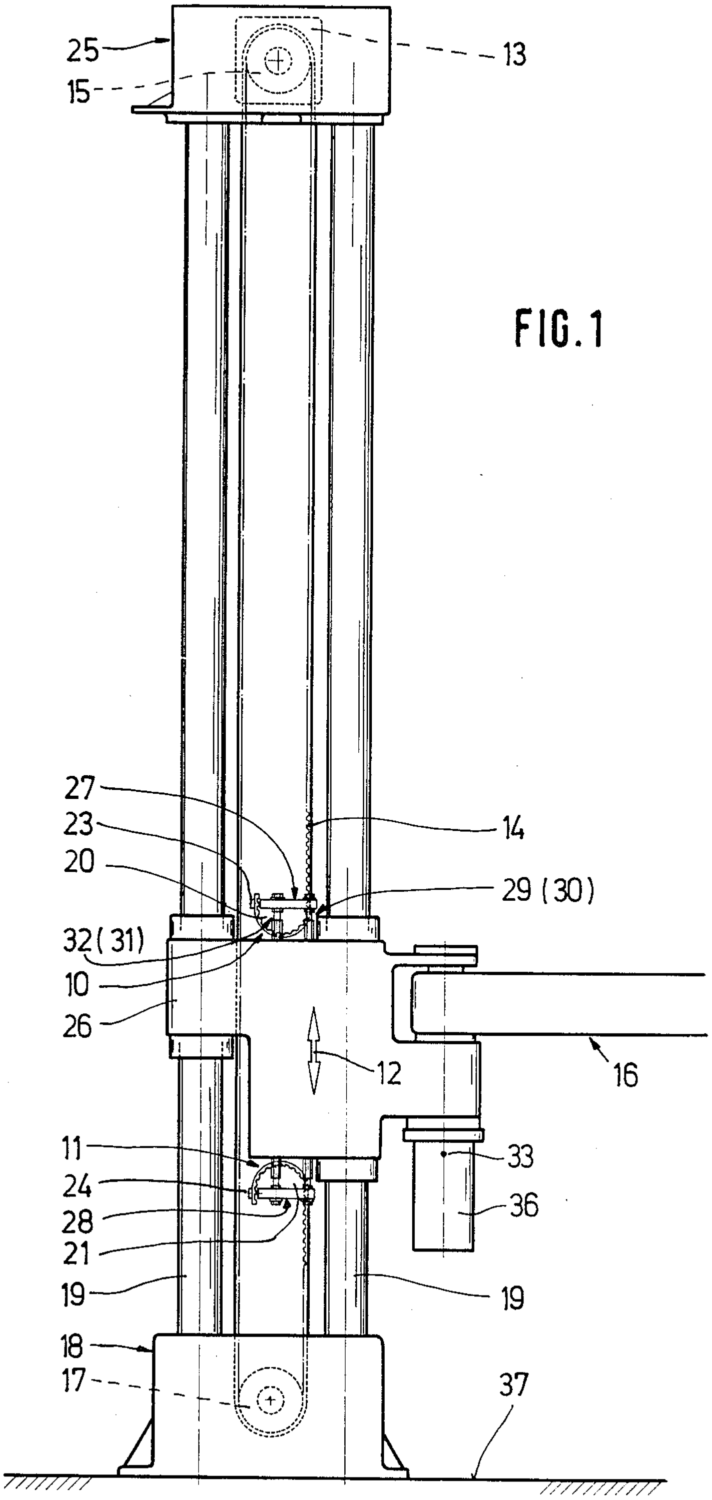
FIG. 1 shows a lifter in side view with a particular representation of the attachment of the toothed belt to the load carrier.

The lifter shown in FIG. 1 comprises a load carrier which can be moved up and down and is in the form of an articulated swivel arm 16 on whose free end means (not shown) are provided for seizing objects, e.g. large cartons of cigarettes, the up and down or lifting and lowering movement of the swivel arm 16 being effected along a vertical guide which is designed in the form of upright guide columns 19. Two guide columns 19 are actually provided which are arranged inside a frame of which only the base 18 and head 25 are shown.

The lifting and lowering movement of the swivel arm 16 along the upright column 19 is effected by a separate drive 13 which is arranged in the head 25 of the frame, the connection between this drive 13 and the swivel arm 16 being made by a toothed belt 14 which on one side is passed around a pinion 15 allocated to the drive 13 and on the other side is passed around a toothed disc 17 rotatably mounted in the base 18 of the frame and whose free ends 10 and 11 respectively are each attached to a guide block 26 of the swivel arm 16. The lifting and lowering movement of the guide block 26 or the swivel arm 16 is shown in FIG. 1 by the double arrow 12. The swivel arm 16 can be swivelled about an axis 33 which extends parallel to the upright guide columns 19. The swivelling movement of the swivel arm 16 about the axis 33 is effected by a swivel drive 36, preferably an electric drive, allocated to this axis 33.

The lifter shown, with the base 18, stands on a horizontal floor 37.

Of particular importance—as already explained at the beginning—is the attachment of the free toothedbelt ends 10, 11 to the guide block 26. For this purpose, the toothed-belt ends 10, 11 are each passed over a toothed halt-roller 20 or 21, fixed to the guide block 26, while the complementary toothed systems of toothed belt 14 and toothed-roller segment 20 or 21 engage positively. When the toothed belt 14 is of smaller width, narrower toothed-wheel segments are used as anchoring elements instead of the toothed-roller segments 20, 21. The toothedbelt ends 10, 11 are therefore passed across the toothed surfaces of the toothed half-rollers 20, 21, as a result of which a very favourable force transfer is achieved with distribution over a plurality of anchoring points.

The toothed half-rollers 20, 21 are fixed to the upper and lower side of the guide block 26, the fixing being effected in such a way that their toothed surfaces face one another. These toothed half-rollers 20, 21 are each fixed to the guide block 26 via a fixing support or frame 27, 28, and in fact while toothed-belt clamping and adjusting elements, which will be dealt with in greater detail further below with reference to FIGS. 2 and 3, are interposed.

The toothed-belt ends 10, 11 are held in their respective associated toothed half-rollers 20, 21 by retaining straps 23 screwed (fixing screws 38) laterally to the frame 27 or 28, these retaining straps 23 essentially only having the function of preventing the toothed-belt ends 10, 11 from falling off the associated toothed half-rollers 20, 21. No significant tensile forces need be absorbed by the retaining straps 23. The retaining straps 23 are each allocated to the outermost free ends of the toothed belt 14. Accordingly, the effective looping angle of the toothed-belt ends 10, 11 around the respective associated toothed half-rollers 20, 21 is 180 degrees. This looping angle is more than adequate for a jolt-proof connection between toothed belt 14 and guide block 26. In smaller embodiments, in particular with smaller loads, looping angles of less than 180 degrees are also satisfactory. However, the looping angle should preferably always be greater than 90 degrees.

Figure 2:
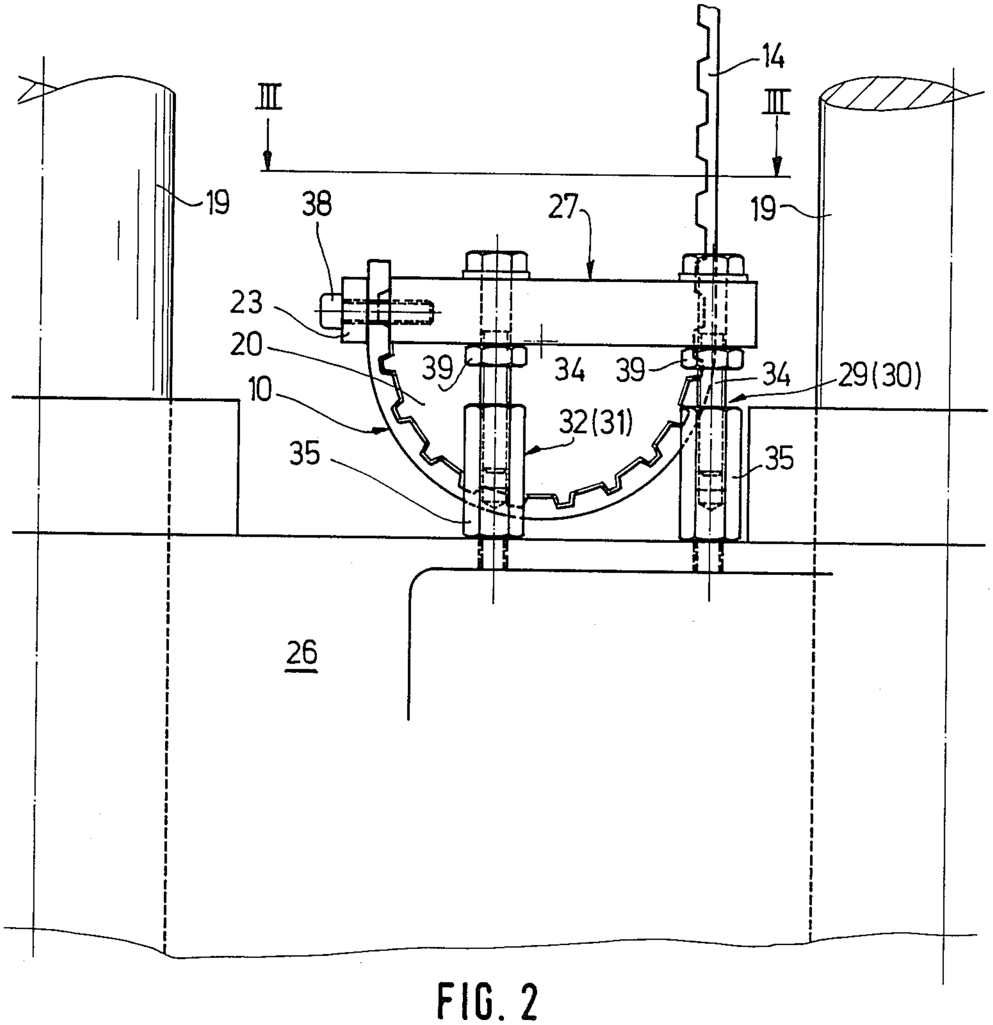
FIG. 2 shows a detail of the lifter according to FIG. 1, namely the attachment of the toothed belt to the load carrier in side view and to an enlarged scale.
Figure 3:
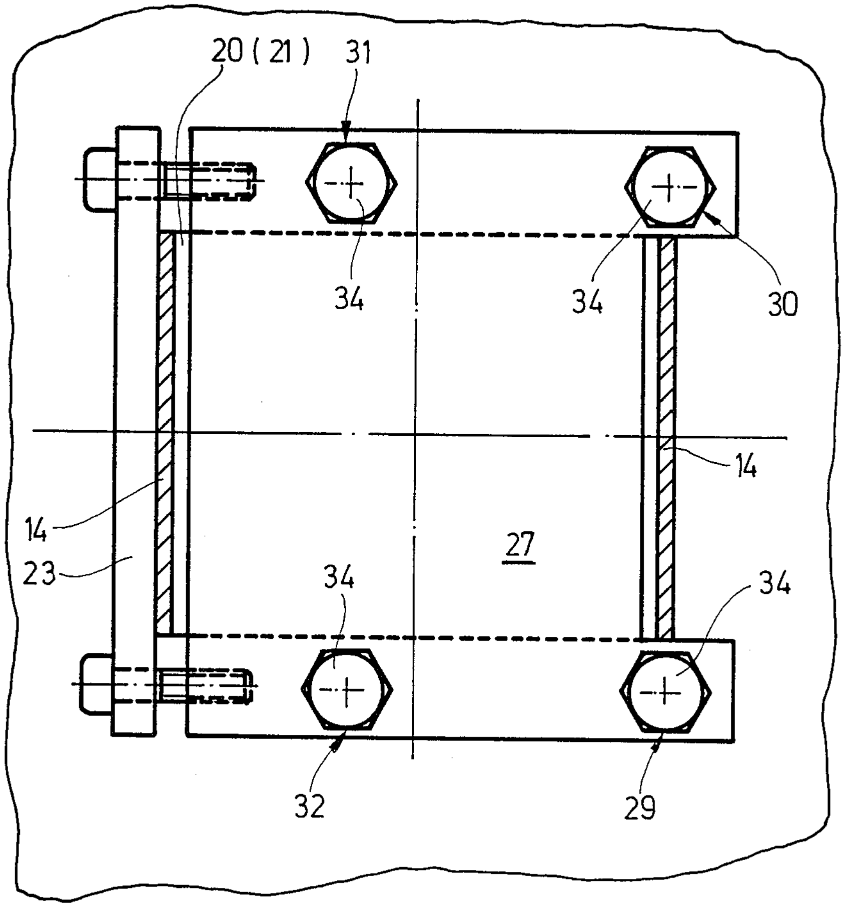
FIG. 3 shows the detail of the lifter shown in FIG. 2 in plan view and likewise to an enlarged scale.

The frames 27, 28, as revealed in FIGS. 2 and 3, are each designed as rectangular mounting plates which are arranged at a distance from the guide block 26, this arrangement being effected via the toothed-belt clamping and adjusting elements already mentioned. These are each defined by a clamping-screw arrangement 29, 30, 31 and 32, four clamping-screw arrangements each, arranged at the corners of an imaginary rectangle, being allocated to each mounting plate 27, 28 in the case of the exemplary embodiment shown. The clamping-screw arrangements 29, 30, 31 and 32 are each formed by a clamping-screw threaded sleeve 35, screwed in on the guide block 26, and a clamping screw 34 which is allocated to this clamping-screw threaded sleeve 35, is passed through the mounting plate 27 or 28 and can be counter-locked by a nut 39. Two clamping-screw arrangements, namely the clamping-screw arrangements 29 and 30, lie in the plane of the toothed belt 14 (see FIGS. 2 and 3), while the other two clamping-screw arrangements, namely clamping-screw arrangements 31, 32, are arranged in the looping area of the toothed-belt ends 10 and 11 respectively, in each case nearer to the retaining straps 23.

The present invention can also be advantageously used in a (palletizing) apparatus in the embodiment of DE Patent Application No. P 36 38 991.9.

We claim:

1. Lifter for loads, in the form of a palletizer for stackable objects, comprising: a load carrier which is movable up and down and which is in the form of an articulated swivel arm (16) on whose free end means are arranged for seizing the objects, the up and down or lifting and lowering movement of the load carrier being effected along upright columns (19) of a vertical guide; and a drive (13) for the lifting and lowering movement of the load carrier at one of the upper and lower ends of the vertical guide (19), a connection between the drive (13) and the load carrier being made by a toothed belt (14) which on one side is passed around a pinion (15) allocated to the drive (13) and on the other side is passed around a toothed disc (17) rotatably mounted on the end of the vertical guide (19) opposite the drive side, and whose free ends (10, 11) are each attached to a guide block (26) of the load carrier; characterized in that the toothed-belt ends (10, 11) are attached to the guide block (26) of the load carrier (16), by, in each case, their passage over a segment of a respective toothed half-wheel, anchored to the guide block (26), so that complementary toothed systems of toothed belt and toothed wheel engage each other positively, the toothed-wheel anchoring segments, with the toothed belt (14) having an appropriate width, being designed as toothed-roller segments (20, 21).

2. Lifter according to claim 1, characterized in that the toothed-belt ends (10, 11) are each held on the respective toothed-roller anchoring segments (20, 21) by retaining straps (23, 24).

3. Lifter according to claim 2, characterized in that the retaining straps (23, 24) act on the free ends of the toothed belt (14).

4. Lifter according to claim 3, characterized in that the toothed-roller anchoring segments (20, 21) are each fixed to a mounting support or frame (27, 28) attached to the guide block (26) of the load carrier (16) via toothed-belt clamping and adjusting elements in the form of clamping-screw arrangements (29, 30, 31, 32).

5. Lifter according to claim 4, characterized in that the mounting support or frame (27, 28), to which each toothed-roller anchoring segment (20, 21) is fixed, is attached to the guide block (26), in such a way that it is adjustable in the direction of the lifting and lowering movement (12) of the guide block (26), via at least three clamping-screw arrangements (29, 30, 31, 32) arranged at the corners of an imaginary rectangle.

6. Lifter according to claim 4 characterized in that the retaining strap (23, 24) is fixed to the mounting support or frame (27, 28) for the toothed-roller anchoring segment (20, 21).

7. Lifter according to claim 5, characterized in that the retaining strap (23, 24) is fixed to the mounting support or frame (27, 28) for the toothed-roller anchoring segment (20, 21).

* * * * *